(12) United States Patent
Ehrlich

(10) Patent No.: US 6,203,114 B1
(45) Date of Patent: Mar. 20, 2001

(54) TEMPERATURE INDICATOR FOR A SEMI-FLUID SYNTHETIC GREASE FILLED AXLE

(75) Inventor: Rodney P. Ehrlich, Monticello, IN (US)

(73) Assignee: Wabash Technology Corporation, Arlington Heights, IL (US)

(*) Notice: Subject to any disclaimer, the term of this patent is extended or adjusted under 35 U.S.C. 154(b) by 0 days.

(21) Appl. No.: 09/351,072

(22) Filed: Jul. 9, 1999

Related U.S. Application Data

(63) Continuation-in-part of application No. 09/237,874, filed on Jan. 27, 1999.

(51) Int. Cl.$^7$ .......................... B60B 35/00; B60B 37/00
(52) U.S. Cl. ........................ 301/124.1; 301/108.2; 116/217; 384/624; 411/82
(58) Field of Search .................... 384/544, 589, 384/448, 624; 116/216, 217, 218; 374/155, 160; 301/105.1, 108.1, 108.2, 108.3, 108.4, 108.5, 124.1 I; 411/81, 82

(56) References Cited

U.S. PATENT DOCUMENTS

| | | |
|---|---|---|
| 1,451,044 | 4/1923 | Leonard . |
| 2,280,755 | 4/1942 | Hexamer . |
| 2,694,997 | 11/1954 | Alger, Jr. . |
| 2,952,238 | 9/1960 | Barber . |
| 3,401,666 | 9/1968 | Munroe . |
| 3,442,249 | 5/1969 | Jamison et al. . |
| 3,569,695 | 3/1971 | McLean . |
| 3,642,327 * | 2/1972 | Walther ............................ 301/108.1 |
| 3,682,130 | 8/1972 | Jeffers . |
| 3,790,777 | 2/1974 | Pelino . |
| 3,792,434 | 2/1974 | Williams . |
| 3,877,411 | 4/1975 | MacDonald . |
| 4,016,762 | 4/1977 | Payne . |
| 4,034,698 * | 7/1977 | Durand ................................. 116/216 |
| 4,074,575 | 2/1978 | Bergman et al. . |
| 4,119,284 | 10/1978 | Belmont . |
| 4,812,826 | 3/1989 | Kaufman et al. . |
| 4,818,119 * | 4/1989 | Busch et al. ......................... 116/217 |
| 4,947,786 | 8/1990 | Maynard et al. . |
| 5,203,278 * | 4/1993 | Kinney ................................ 116/218 |
| 5,315,954 | 5/1994 | Richmond . |
| 5,380,092 | 1/1995 | Alain . |
| 5,487,352 | 1/1996 | Williams et al. . |
| 5,538,330 * | 7/1996 | Ehrlich ............................. 301/108.1 |
| 5,658,053 * | 8/1997 | Vencill et al. .................... 301/105.1 |
| 5,718,633 | 2/1998 | Gehrke . |
| 5,833,371 | 11/1998 | Gomez et al. . |

FOREIGN PATENT DOCUMENTS 9310365   5/1993   (WO) .

* cited by examiner

*Primary Examiner*—S. Joseph Morano
*Assistant Examiner*—Jason R. Bellinger
(74) *Attorney, Agent, or Firm*—Trexler, Bushnell, Giangiorgi, Blackstone & Marr, Ltd.

(57) ABSTRACT

A novel temperature probe provides a visual indicator to an operator of when an assembly, such as a vehicle axle, filled with a semi-fluid synthetic grease for lubricating the bearings therein has reached an unsafe temperature during operation. In one embodiment, the temperature probe is provided in a specially drilled bore through one of the components. In another embodiment, the temperature probe is provided in a bore drilled into a fastener member which is normally used in the assembly. The temperature probe includes an indicator pin which is mounted in a housing. When the components reach an unsafe temperature during operation, the indicator pin pops outwardly from the housing to alert a user that an unsafe temperature has been reached.

44 Claims, 4 Drawing Sheets

TEMPERATURE INDICATOR FOR A SEMI-FLUID SYNTHETIC GREASE FILLED AXLE

This application is a continuation-in-part patent application of Ser. No. 09/237,874 filed on Jan. 27, 1999 and entitled "TEMPERATURE PROBE FOR A SEMI-FLUID GREASE FILLED AXLE".

BACKGROUND OF THE INVENTION

This invention is generally directed to a novel temperature indicator for providing a visual indication to an operator of when a vehicle axle, such as a trailer axle, filled with a semi-fluid synthetic grease for lubricating the wheel bearings therein has achieved an unsafe temperature. More particularly, one form of the present invention is directed to a novel temperature indicator that can be retrofit into existing vehicle axles without modification of the design of the axle.

Current trailer hub/bearing designs have moved towards using a semi-fluid synthetic grease lubricant for lubricating the wheel bearings instead of gear oil as had commonly been used in prior trailer hub/bearing designs. Semi-fluid synthetic grease is more advantageous because it is not as sensitive to a less than perfect wheel seal and therefore, leakage is less likely that with an oil filled axle hub.

When leakage occurs with an oil filled axle hub, the oil spreads or sprays around the axle, saturating everything in the area. This can result in a fire from hot brake shoes and drums that become coated with oil if a seals fails.

When leakage occurs with a semi-fluid synthetic grease filled axle hub, because the semi-fluid synthetic grease is more solid than oil, the semi-fluid synthetic grease does not spread or spray around the axle like oil. The semi-fluid synthetic grease merely pushes out past the seal and either falls away cleanly, or just stays present around the immediate area, thereby preventing fires.

An advantage of using an oil filled axle hub is that such hubs were easy to monitor with a window in the hub cap that had a fill line. If the user found that the oil was low (i.e., below the fill line), a plug was simply pulled on the hub cap and oil was added until the level reached the fill line.

With a semi-fluid synthetic grease filled axle hub, however, the semi-fluid synthetic grease does not flow through the bearings, but tends to stay in the grease chamber in the hub even when the wheel stops. This occurs especially in cool weather since the semi-fluid synthetic grease is used. At low temperatures, the viscosity of the semi-fluid synthetic grease is heavy like a grease, but at higher temperatures, the semi-fluid synthetic grease starts to flow more like a heavy liquid.

Because of this characteristic of the semi-fluid synthetic grease, a hub cap without a window is used to prevent the mechanic from mistakenly thinking that the hub was low on oil since the oil level would not show up in the window. Because the window used with oil does not work with a semi-fluid synthetic grease filled hub, usually a simple metal or solid plastic cap is employed. The problem that results is that the mechanic cannot monitor the axle to determine whether an adequate amount of lubrication is present. It is well know that if a wheel bearing is operated for a long time without adequate lubrication, the bearing will heat up significantly and cause the hub to also heat up since the bearings press into the wheel/hub. This can result in a catastrophic bearing failure if this condition is left undetected.

The present invention presents a novel temperature indicator for providing a visual indication to an operator of when a vehicle axle, such as a trailer axle, filled with a semi-fluid synthetic grease for lubricating the wheel bearings therein has achieved an unsafe temperature. One form of the temperature indicator of the present invention can be easily retrofit into existing trailers, without modification of the trailer. Other features and advantages of the present invention will become apparent upon a reading of the attached specification, in combination with a study of the drawings.

OBJECTS AND SUMMARY OF THE INVENTION

A general object of the present invention is to provide a novel temperature indicator for providing a visual indication to an operator of when a vehicle axle, such as a trailer axle, filled with a semi-fluid synthetic grease for lubricating the wheel bearings therein has reached an unsafe temperature.

An object of the present invention is to provide a novel temperature indicator which can be retrofit into existing vehicle axles without modification of the design of the axle.

Another object of the present invention is to provide a novel temperature probe which can be used in combination with a fill hole in a vehicle axle.

Briefly, and in accordance with the foregoing, the present invention discloses a novel temperature indicator for providing a visual indication to an operator of when a vehicle axle, such as a trailer axle, filled with a semi-fluid synthetic grease for lubricating the wheel bearings therein has achieved an unsafe temperature.

In one embodiment, the temperature probe is provided through a metal wheel hub of a conventional wheel mounting apparatus. The wheel mounting apparatus includes an axle, the wheel hub which is rotatably mounted on the axle by a plurality of wheel bearings, and a chamber provided between the wheel hub and the axle for housing the semi-fluid synthetic grease for lubricating the wheel bearings. The temperature probe is formed from an indicator pin which is mounted in a housing. When the bearings reach an unsafe temperature, the indicator pin pops outwardly from the housing and the wheel hub to alert a user that an unsafe temperature has been reached by the bearings.

In another embodiment, and in the preferred embodiment, a temperature probe is provided in one of the hub cap bolts or fastener members of a conventional wheel mounting apparatus which is used to mount a hub cap to the wheel hub. The temperature probe is formed from an indicator pin which is mounted in a housing. When the axle reaches an unsafe temperature, the indicator pin pops outwardly from the housing and the hub cap to alert a user that an unsafe temperature has been reached by the axle.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
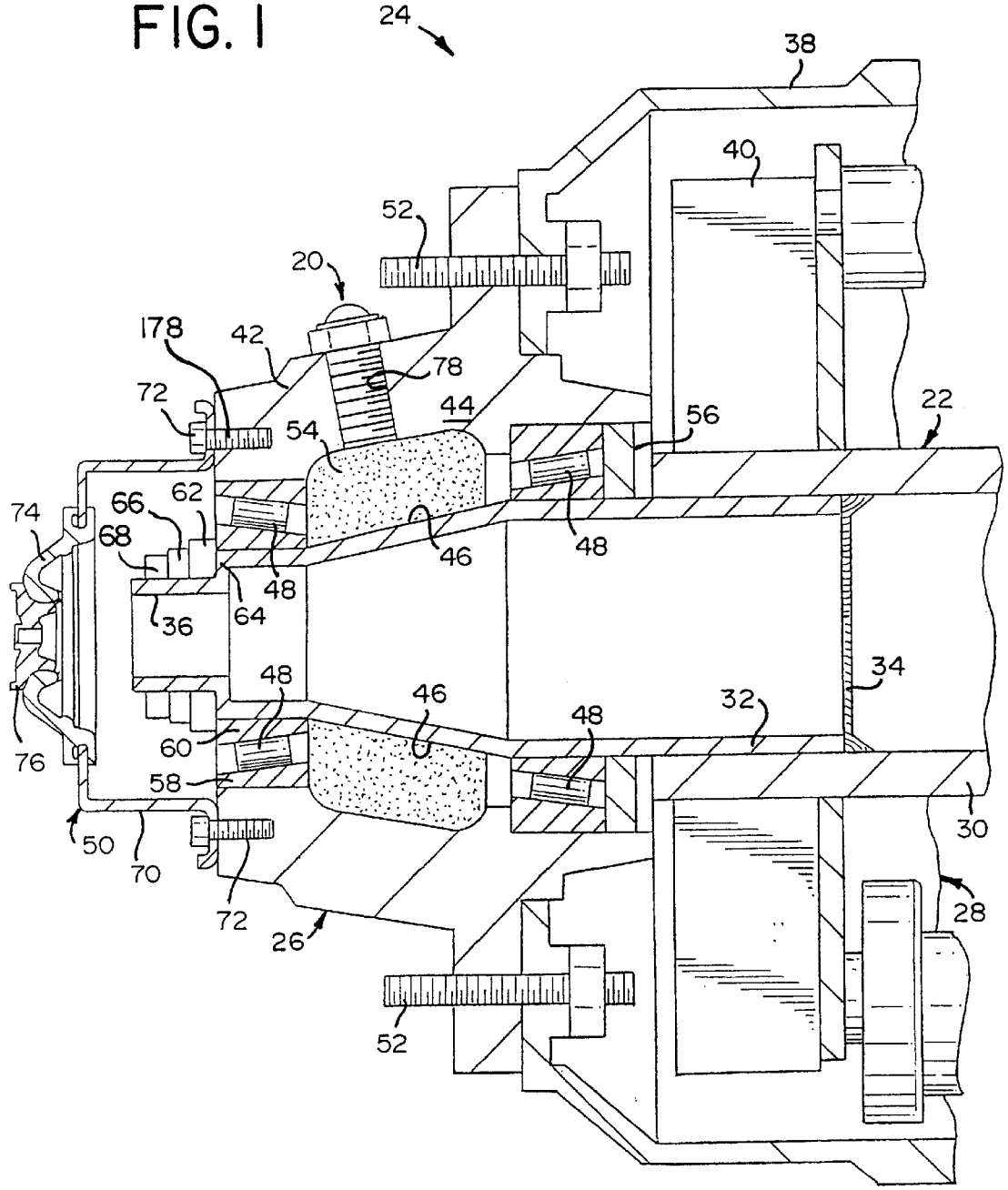
FIG. 1 is a cross-sectional view of a wheel mounting apparatus and an axle having a novel temperature probe attached thereto which incorporates the features of a first embodiment of the invention, such temperature probe being in a first position indicating to the user that the axle is at a safe temperature.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a novel temperature indicator 20, 120 for an assembly which uses synthetic grease lubricated bearings 48, such as a conveyor belt assembly or a vehicle, for example a trailer, for visually indicating to a user when an unsafe temperature has been reached by the bearings 48 during operation. As shown in the drawings, the temperature indicator 20, 120 is provided on a wheel mounting apparatus 24 of a trailer. It is to be understood that the present invention can be used in a variety of mechanical assemblies, so long as the assembly includes bearings between two moving components to allow the one component to rotate relative to the other component.

Figure 2:
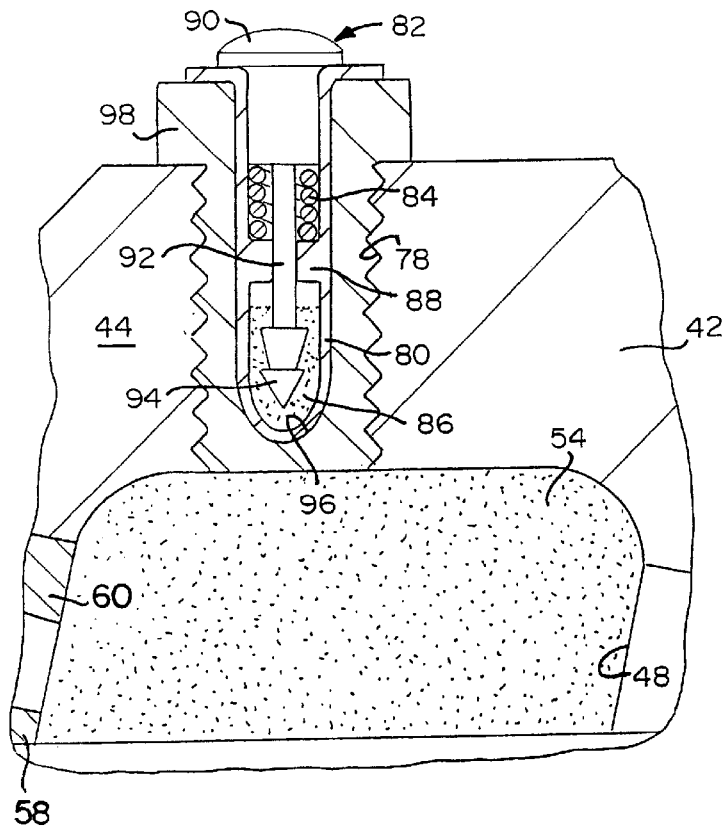
FIG. 2 is an enlarged view of FIG. 1 showing a portion thereof.
Figure 3:
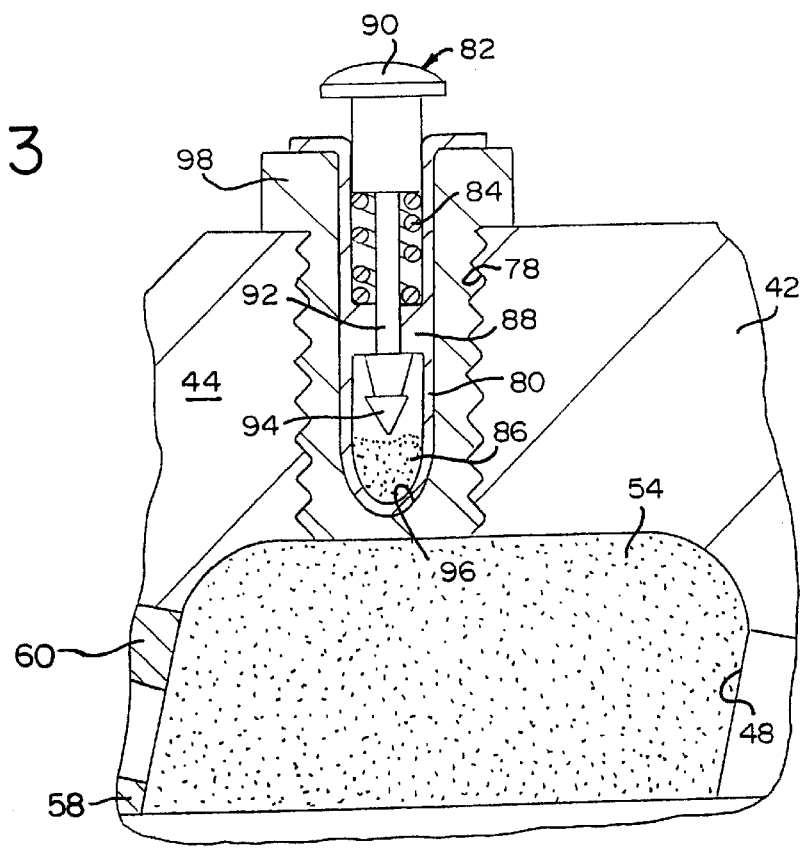
FIG. 3 is an enlarged, cross-sectional view of a portion of the wheel mounting apparatus of FIG. 1 having the temperature probe attached thereto, such temperature probe being in a second position indicating to the user that the bearings have reached an unsafe temperature.

A first embodiment of the invention is shown in FIGS. 1–3. A second embodiment of the invention is shown in FIGS. 4–7. Each is shown in a wheel mounting apparatus 24.

The wheel mounting apparatus 24 is used for mounting a wheel (not shown) on the vehicle. The wheel mounting apparatus 24 generally includes the axle 22, a wheel hub assembly 26 and a brake assembly 28.

The axle 22 is fixedly mounted on the vehicle body by suitable means and is formed from a hollow tube 30 having ends (only one of which is shown) having a hollow spindle 32 attached thereto by, for example, a weld 34. The spindle 32 is a hollow, tapered member having a threaded end 36. The hollow tube 30 and spindle 32 of the axle 22 define a volume therein. The axle 22 is formed from a suitable strong rigid material.

The brake assembly 28 is of known construction and as such is not described in detail herein. The brake assembly 28 is mounted on the axle 22 and generally includes a brake drum 38 and a brake shoe 40.

The wheel hub assembly 26 is mounted on the end of the axle 22 and generally surrounds the spindle 32. The wheel hub assembly 26 includes a metal wheel hub 42 having a wall 44 which defines a space, cavity or chamber 46 between the wheel hub 42 and the spindle 32, a plurality of wheel bearings 48 and a hub cap 50. The wheel hub 42 is attached to the brake drum 38 by suitable known means, such as bolts 52.

A bath of semi-fluid synthetic grease 54 is contained within the wheel hub chamber 46. The semi-fluid synthetic grease 54 lubricates the wheel bearings 48 and the axle 22 during operation of the vehicle. A slip ring type seal 56 is provided between the wheel hub 42 and the axle 22 to prevent the semi-fluid synthetic grease 54 from leaking out from the chamber 46 at the intersection of the wheel hub 42 and the axle 22.

The wheel bearings 48 are mounted between the wheel hub 42 and the spindle 32 by a bearing cup 58 and a bearing cone 60. An inner adjusting nut 62 is threaded onto the threaded end 36 of the spindle 32 and bears against the bearing cone 66 and a shoulder 64 formed in the spindle 32 to position the wheel bearings 48. The adjusting nut 62 is locked onto the spindle 32 by threading a lockwasher 66 and an outer jam nut 66 on the threaded end 36. The wheel bearings 48 allow the wheel hub assembly 26 and the brake drum 38 to rotate relative to the fixed axle 22. The bearings 48 are mounted on both sides of the chamber 46 and are lubricated by the bath of semi-fluid synthetic grease 54 contained within the chamber 46.

The hub cap 50 includes a first, solid cap member 68 attached to the end of the wheel hub 42 by a plurality of metal bolts or fastener members 72, which are discussed in more detail herein, a second, solid cap member 74 attached to the outer face of the first cap member 68 by suitable means, and a sintered metal plug 76 attached to the center of the second cap member 74 by suitable means for preventing the build-up of pressure formed under heating conditions of operations within the wheel hub 42 which might force the semi-fluid synthetic grease 54 through the slip ring seal 56. The hub cap 50 seals the outer end of the hub chamber 46 and prevents the semi-fluid synthetic grease 54 from leaking out of the end of the wheel hub assembly 26.

The bolts 72, which preferably number six, are evenly spaced at a position radially outward of a centerline of the axle 22. Each bolt 72 includes a threaded shank 178 which is five-sixteenths of an inch in diameter and which depends from a head 180. A plurality of threaded holes are formed in the cap member 70 at positions which are approximately one-eighth of an inch outward of the bearing cups 58. Likewise, a plurality of threaded blind holes are formed in the wheel hub 42 at positions which are approximately one-eighth of an inch outward of the bearing cups 58. The holes and the blind holes are aligned with each other and the threaded shank 178 of respective bolts 72 are respectively threaded therethrough to clamp the hub cap 50 onto the wheel hub 42. The head 180 of each bolt 72 sits against the exterior of the cap member 70. The bolts 72 only clamp the cap member 70 to the end of the wheel hub 42. There is no shear load placed on the bolts 72.

During operation of the vehicle, as the wheel, wheel hub 42, hub cap 50 and brake drum 38 rotate, heat is generated. This causes the semi-fluid synthetic grease 54 within the chamber 46 to increase in temperature. Also during operation, some semi-fluid synthetic grease 54 may leak into the hub cap 50 through the space between the bearing cup 58 and the bearing cone 60 where the wheel bearings 48 are located and may leak through the slip ring seal 56.

With regard to the first embodiment of the invention as shown in FIGS. 1–3, in order to visually alert an operator of when an unsafe temperature has been reached by the bearings 48 and the axle 22, the novel visual indicating means of the present invention is provided. The bearings 48 and axle 22 can reach an unsafe temperature as a result of a variety of conditions, for example, the bath of semi-fluid synthetic grease 54 in the chamber 46 becoming overheated as a result of heating conditions of operation within the wheel mounting apparatus 24, because of a loss of grease 54 in the chamber 46, because of contamination of the grease 54 or because of race failure of the bearing cup 58 and/or bearing cone 60. As shown in FIGS. 1–3, the temperature probe 20 which forms the visual indicating means is removably mounted in a port 78 provided through the wall 44 of the wheel hub 42. The port 78 is threaded and is in communication with the chamber 46. When the temperature probe 20 is removed from engagement with the port 78, the port 78 is used as a fill hole for filling the chamber 48 with semi-fluid synthetic grease 54.

As best shown in FIGS. 2 and 3, the temperature probe 20 includes a cup-like housing 80, an indicator pin 82, a spring 84 and a quantity of solder 86 mounted within the housing 80. The housing 80 has a closed end and an open end at the opposite end thereof. A shoulder 88 is provided along the length of the interior wall of the housing. The indicator pin 82 has a head 90 and a shank 92 extending therefrom. The shank 92 is within the housing 80 and has a barbed end 94 which is embedded in the solder 86 which is provided at the closed end of the housing 80. The barbs on the end 94 of the shank 92 ensure that the indicator pin 82 does not prematurely dislodge from the solder 86. An end of the spring 84 is seated against the shoulder 88 and the opposite end of the spring 84 is seated against the head 90 of the indicator pin 82.

The temperature probe 20 is securely mounted in a recess of a brass plug 98. The temperature probe 20 is suitably held within the brass plug 98, such as by a friction fit or by adhesive. The brass plug 98 is threadedly mounted in the port 78. The brass plug 98, and thus the temperature probe 20, can be removed from engagement with the wall 44 of the wheel hub 42 by unthreading the plug 98 therefrom. When the plug 98 and the temperature probe 20 are removed from the wheel hub 42, semi-fluid synthetic grease 54 can be added to the chamber 46 through the open port 78.

As the wheel, wheel hub assembly 26 and brake drum 38 turn relative to the axle 22, heat is generated. If the bearings 48 are properly lubricated during operation (a sufficient quantity and quality of semi-fluid synthetic grease 54 is present in the chamber 46) or if race failure has not occurred, the head 90 of the indicator pin 82 will remain against the open end of the housing 80 as shown in FIGS. 1 and 2. If an insufficient quantity or quality of the semi-fluid synthetic grease 54 is present in the chamber 46 during operation to properly lubricate the bearings 48, or if race failure has occurred, a rise in temperature results within the chamber 48. When the temperature reaches a predefined level (for example, normal operating temperature of the axle 22 is 180° F. and 250° F. solder 86 is used), sufficient heat is transmitted to the solder 86 through the brass plug 98 to melt the solder 86. Once the solder 86 melts, the barbed end 94 of the indicator pin 82 is released therefrom and the spring 84 biases the indicator pin 82 outwardly from the housing 80 until the barbed end 94 contacts the shoulder 88 within the housing 80. Once the operator sees that the head 90 of the indicator pin 82 has moved away from or "popped out" of the housing 80 as shown in FIG. 3, he or she will know that an investigation is in order. The operator will then remove the plug 98 and thus the temperature probe 82 by unthreading the plug 98 from the wheel hub 42 to perform a check as described herein, and add semi-fluid synthetic grease 54 if necessary to prevent a catastrophic bearing failure which would result if this condition was left undetected.

As one of ordinary skill in the art would realize, the temperature probe 20 may take of variety of forms so long as a visual indication is provided to the user that an unsafe temperature has been reached by the axle 22. For example, the indicator pin 82 could be biased inwardly. The plug 98 can be welded through a port in the wheel hub 42 and a second fill hole can be provided (which would have closing member associated therewith) for filling the chamber 46 with semi-fluid synthetic grease 54. Additionally, the plug 98 and the temperature probe 20 can be designed as an integral member.

With regard to the second embodiment of the invention as shown in FIGS. 4–7, in order to visually alert an operator of when an unsafe temperature has been reached by the bearings 48 and the axle 22, the novel visual indicating means of the present invention is provided. Again, the axle 22 can reach an unsafe temperature as a result of a variety of conditions, for example, the bath of semi-fluid synthetic grease 54 in the chamber 46 becoming overheated as a result of heating conditions of operation within the wheel mounting apparatus 24, because of a loss of grease 54 in the chamber 46, because of contamination of the grease 54 or because of race failure of the bearing cup 58 and/or bearing cone 60. As shown in the drawings, the temperature indicator 120 includes a temperature probe 181 which is mounted in one of the bolts 72, which is preferably a grade 8 hub cap bolt. In this embodiment, the port 78 of FIGS. 1–3 is replaced by a standard fill port (not shown).

Figure 5:
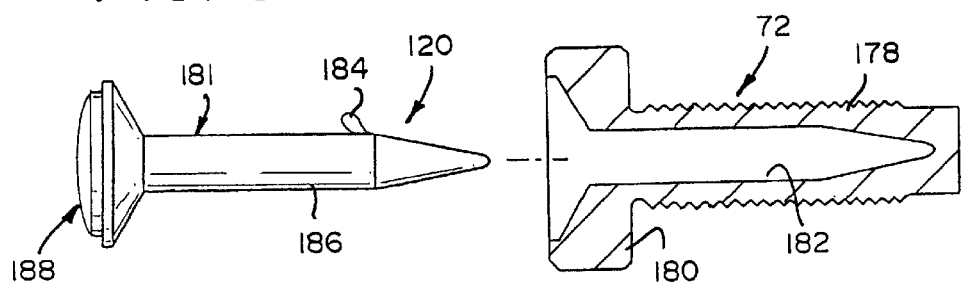
FIG. 5 is an exploded view of the temperature indicator of FIG. 4 which is formed from a temperature probe and a hub cap bolt or fastener member which is shown in cross-section.

As shown in FIG. 5, a three-sixteenths of an inch smooth, blind bore 182 is drilled in one of the bolts 72. The blind bore 182 is aligned with the centerline of the bolt 72. The temperature probe 181 is secured by adhesive 184 within the blind bore 182. Preferably, the adhesive 184 is applied as a one-sixteenth of inch diameter bead of urethane and the temperature probe 181 is twisted as it is inserted into the blind bore 182 in the bolt 72.

Figure 6:
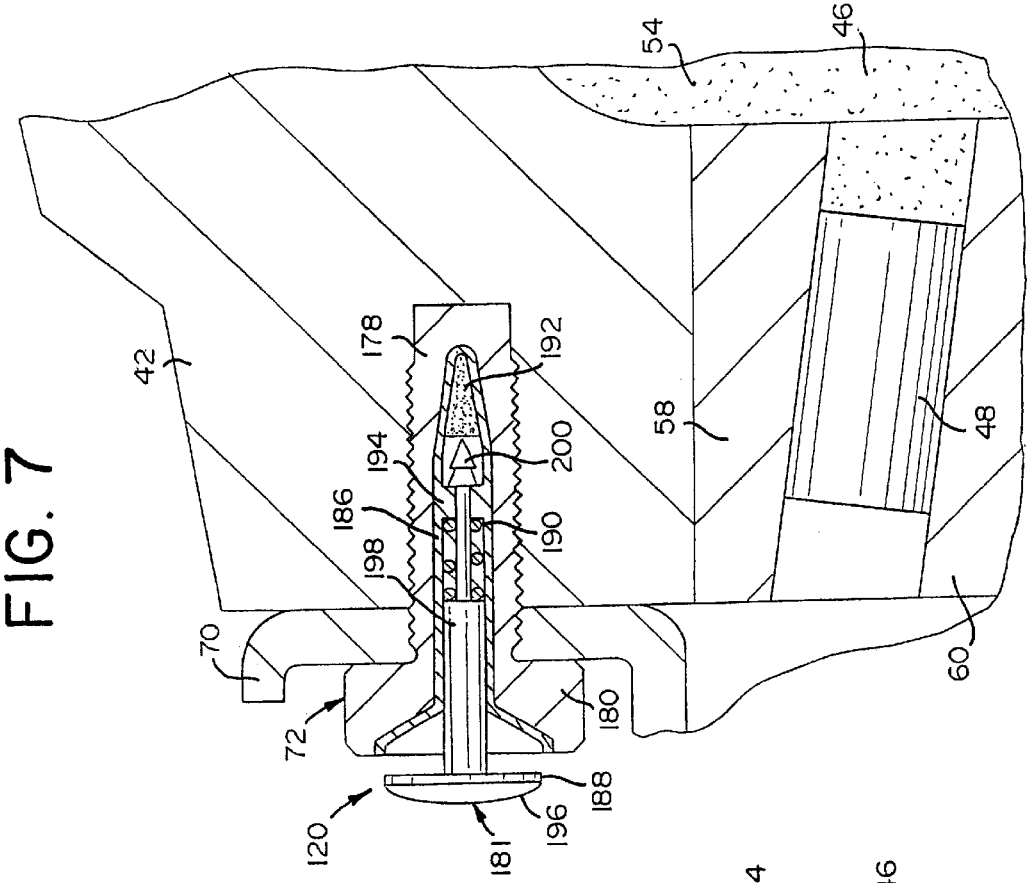
FIG. 6 is an enlarged view of FIG. 4 showing a portion thereof.
Figure 7:
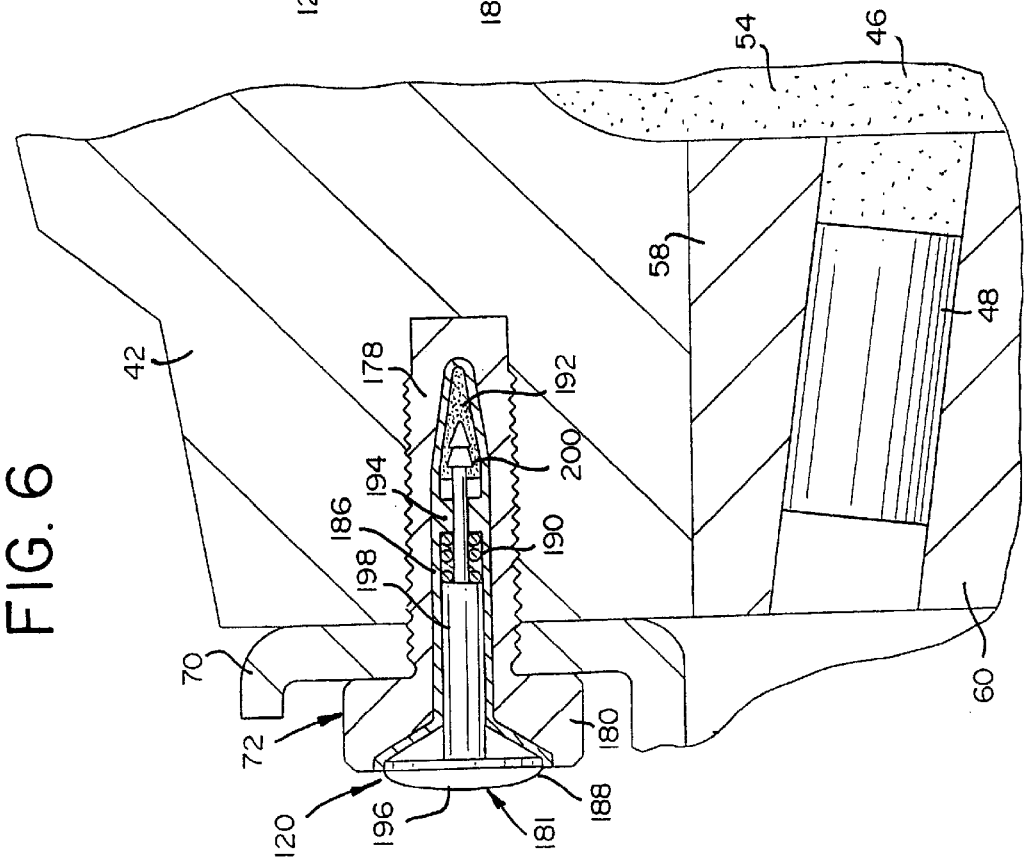
FIG. 7 is an enlarged, cross-sectional view of a portion of the wheel mounting apparatus of FIG. 4 having the temperature probe attached thereto, such temperature probe being in a second position indicating to the user that the axle is at an unsafe temperature.

As best shown in FIGS. 6 and 7, the temperature probe 181 includes a cup-like housing 186, an indicator pin 188, a spring 190 and a quantity of solder 192 mounted within the housing 186. The housing 186 has a closed end and an open end at the opposite end thereof. A shoulder 194 is provided along the length of the interior wall of the housing 186. The indicator pin 188 has a head 196 and a shank 198 extending therefrom. The shank 198 is within the housing 186 and has a barbed end 200 which is embedded in the solder 192 which is provided at the closed end of the housing 186. The barbs on the end 200 on the shank 198 ensure that the indicator pin 188 does not prematurely dislodge from the solder 192. An end of the spring 190 is seated against the shoulder 194 and the opposite end of the spring 190 is seated against the head 196 of the indicator pin 188.

Figure 4:
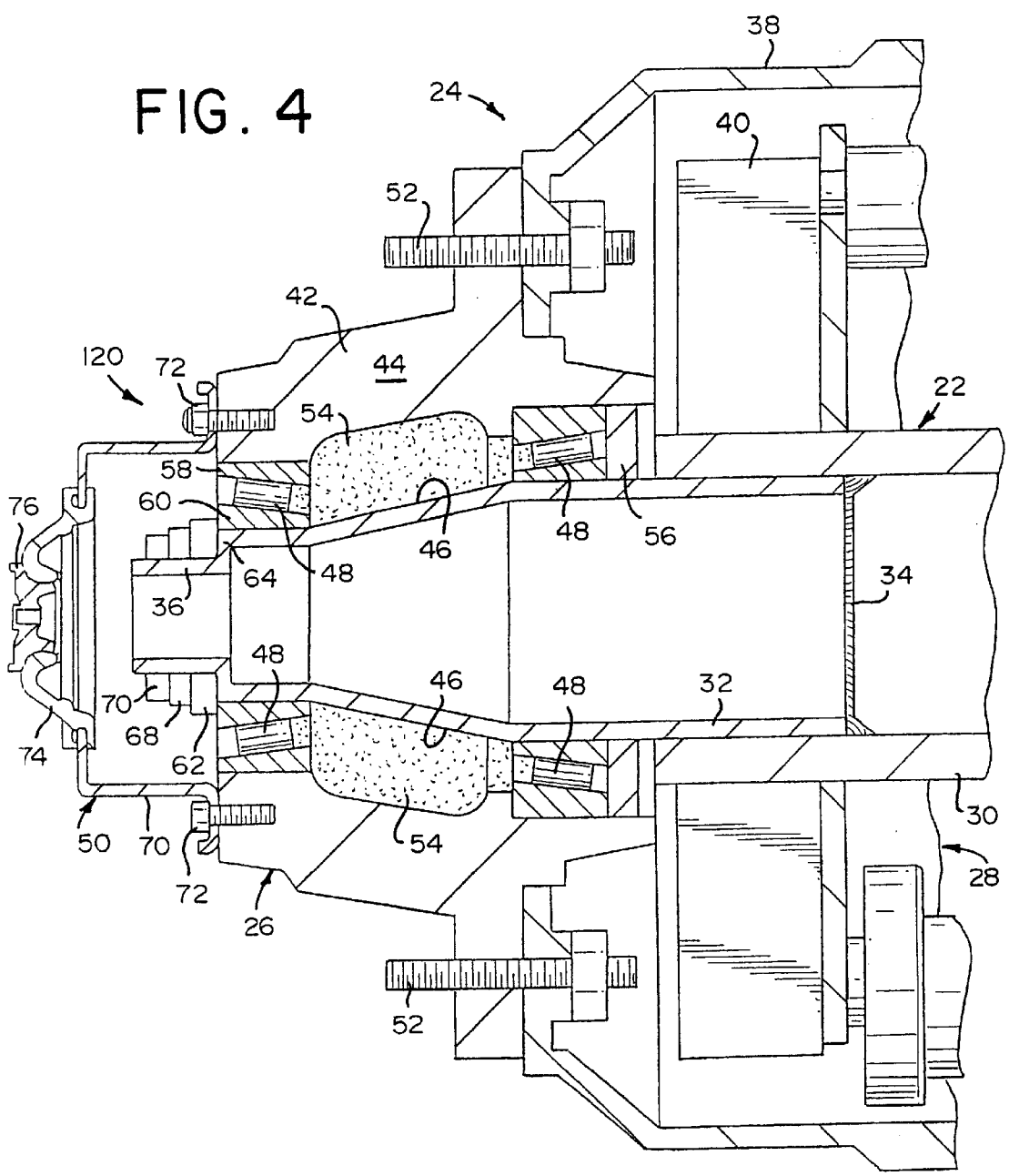
FIG. 4 is a cross-sectional view of a wheel mounting apparatus and an axle having a novel temperature indicator attached thereto which incorporates the features of a second embodiment of the invention, such temperature indicator being in a first position indicating to the user that the axle is at a safe temperature.

As the wheel, wheel hub assembly 26 and brake drum 38 turn relative to the axle 22, heat is generated. If the bearings 48 are properly lubricated during operation (a sufficient quantity and quality of the semi-fluid synthetic grease 54 is present in the chamber 46), or if race failure of the bearing cup 58 and/or bearing cone 60 has not occurred, the head 196 of the indicator pin 188 will remain against the open end of the housing 186 as shown in FIGS. 4 and 6. If an insufficient quantity or quality of the semi-fluid synthetic grease 54 is present in the chamber 46 during operation to properly lubricate the bearings 48, or race failure has occurred, a rise in temperature results within the chamber 46. When the temperature reaches a predefined level (for example, normal operating temperature of the axle 22 is 180° F. and 250° F. solder 92 is used), sufficient heat is transmitted to the solder 192 through the metal wheel hub 42 and the metal bolt 72 to melt the solder 192. Once the solder 192 melts, the barbed end 200 of the indicator pin 188 is released therefrom and the spring 190 biases the indicator pin 188 outwardly from the housing 186 until the barbed end 200 contacts the shoulder 194 within the housing 186. Once the operator sees that the head 196 of the indicator pin 188 has moved away from or "popped out" of the housing 186 as shown in FIG. 7, he or she will know that an investigation is in order. The operator can perform a check as described herein, and add semi-fluid synthetic grease 54 through a port in the wheel hub 42 if necessary to prevent a catastrophic bearing failure which would result if this condition was left undetected.

As one of ordinary skill in the art would realize, the temperature probe 181 may take of variety of forms so long as a visual indication is provided to the user that an unsafe temperature has been reached by the axle 22. For example, the indicator pin 188 could be biased inwardly. The bolt 72 and the temperature probe 181 can be designed as an integral member. Also, if desired, the temperature probe 181 could be provided in more than one bolt 72.

A benefit of providing the temperature probe 181 in one of the bolts 72 is that this invention can be easily retrofit into existing apparatuses, such as wheel mounting apparatus 24, without requiring a change in the existing structure.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. An apparatus comprising: an axle; a wheel hub rotatably mounted on said axle by a plurality of wheel bearings; a chamber provided between said wheel hub and said axle adapted to receive a semi-fluid synthetic grease for lubricating said wheel bearings; and visual indicating means associated with said chamber for providing a visual indication to a user of the temperature of said wheel bearings, said visual indicating means comprising a member, a biasing component which biases said member relative to said chamber when a predetermined temperature is reached by said wheel bearings, a housing in which said member is provided, said housing being disposed in a metal plug, said housing including material therein which becomes viscous upon the application of a predetermined amount of heat to permit said member to be biased relative to said housing when said predetermined temperature is reached by said wheel bearings.

2. An apparatus as defined in claim 1, wherein said member is biased outwardly relative to said chamber when said predetermined temperature is reached by said wheel bearings.

3. An apparatus as defined in claim 1, wherein said visual indicating means is provided through a wall of said wheel hub.

4. An apparatus as defined in claim 3, wherein said member is biased outwardly from said wall.

5. An apparatus as defined in claim 3, wherein a port is provided through said wall of said wheel hub in which said visual indicating means is provided, said visual indicating means being removable from said port.

6. An apparatus as defined in claim 3, wherein a port is provided through said wall of said wheel hub, said visual indicating means being threaded into engagement with said port and being removable from said port.

7. An apparatus as defined in claim 1, wherein said biasing component is a spring.

8. An apparatus as defined in claim 1, wherein said material in said housing is solder which melts and permits said member to be biased relative to said housing when said predetermined temperature is reached by said wheel bearings.

9. An apparatus as defined in claim 1, wherein said metal plug is brass.

10. An wheel mounting apparatus as defined in claim 1, further comprising a hub cap mounted on said wheel hub by a plurality of bolts, said visual indicating means being disposed on at least one of said bolts.

11. An apparatus as defined in claim 10, wherein said bolt includes a threaded shank having a bore therein, and said visual indicating means is disposed in said bore.

12. An apparatus as defined in claim 11, wherein said visual indicating means comprises a biasing component which biases a member relative to said threaded shank when said predetermined temperature of the wheel bearings is reached.

13. An apparatus as defined in claim 12, wherein said member is biased outwardly relative to said threaded shank when said predetermined temperature of the wheel bearings is reached.

14. An apparatus as defined in claim 13, wherein said biasing component is a spring.

15. An apparatus comprising: an axle; a wheel hub rotatably mounted on said axle by a plurality of wheel bearings; a hub cap mounted on said wheel hub by a plurality of bolts; a chamber provided between said wheel hub and said axle adapted to receive a semi-fluid synthetic grease for lubricating said wheel bearings; and visual indicating means associated with said chamber for providing a visual indication to a user of the temperature of said wheel bearings, said visual indicating means being disposed on at least one of said bolts, said one bolt including a threaded shank having a bore therein, and said visual indicating means being disposed in said bore, said visual indicating means comprising a biasing component which biases a member relative to said threaded shank when a predetermined temperature of the wheel bearings is reached, said member being provided in a housing disposed in said bore, said housing including material therein which becomes viscous upon the application of a predetermined amount of heat to permit said member to be biased relative to said housing when said predetermined temperature of the wheel bearings is reached.

16. An apparatus comprising: an axle; a wheel hub rotatably mounted on said axle by a plurality of wheel bearings; a hub cap mounted on said wheel hub by a plurality of bolts; a chamber provided between said wheel hub and said axle adapted to receive a semi-fluid synthetic grease for lubricating said wheel bearings; and visual indicating means associated with said chamber for providing a visual indication to a user of the temperature of said wheel bearings, said visual indicating means being disposed on at least one of said bolts, said one bolt includes a threaded shank having a bore therein, and said visual indicating means being secured in said bore by adhesive.

17. A temperature indicator capable of being used in an assembly, said assembly including at least one bearing which is lubricated by semi-fluid synthetic grease, said temperature indicator comprising: a bolt having a threaded shank, said threaded shank has a bore therein, said bolt being capable of being mounted to a component of the assembly, and visual indicating means carried by said bolt for providing a visual indication to a user of temperature of the at least one bearing, said visual indicating means being disposed in said bore and comprising a housing, a member provided in said housing, said housing being disposed in said bore, a biasing component which biases said member relative to said threaded shank when a predetermined temperature is reached, said housing including material therein which becomes viscous upon the application of a predetermined amount of heat to permit said member to be biased relative to said housing when said predetermined temperature is reached by said wheel bearings.

18. A temperature indicator as defined in claim 17, wherein said member is biased outwardly relative to said threaded shank when said predetermined temperature is reached.

19. A temperature indicator as defined in claim 18, wherein said biasing component is a spring.

20. A temperature indicator as defined in claim 17, wherein said material in said housing is solder which melts and permits said member to be biased relative to said housing when said predetermined temperature is reached.

21. A temperature indicator capable of being used in an assembly, said assembly including at least one bearing which is lubricated by semi-fluid synthetic grease, said temperature indicator comprising: a bolt having a threaded shank, said bolt being capable of being mounted to a component of the assembly, said threaded shank having a bore therein, and visual indicating means disposed in said bore of said bolt for providing a visual indication to a user of temperature of the at least one bearing, said visual indicating means being secured in said bore by adhesive.

22. An assembly comprising:
a first component;
a second component rotatably mounted on said first component by at least one bearing;
a chamber provided between said first component and said second component;
a semi-fluid synthetic grease within said chamber for lubricating said at least one bearing; and
visual indicating means associated with said chamber for providing a visual indication to a user of the temperature of said at least one bearing, said visual indicating means comprising a housing, a member provided in said housing, said housing being disposed in a metal plug, a biasing component which biases said member relative to said chamber when a predetermined temperature is reached by said at least one bearing, said housing including material therein which becomes viscous upon the application of a predetermined amount of heat to permit said member to be biased relative to said housing when said predetermined temperature is reached by said wheel bearings.

23. An assembly as defined in claim 22, wherein said member is biased outwardly relative to said chamber when said predetermined temperature is reached by said at least one bearing.

24. An assembly as defined in claim 22, wherein said visual indicating means is provided through a wall of one of said components.

25. An assembly as defined in claim 24, wherein said member is biased outwardly from said one component.

26. An assembly as defined in claim 24, wherein a port is provided through said wall of said one component in which said visual indicating means is provided, said visual indicating means being removable from said port.

27. An assembly as defined in claim 24, wherein a port is provided through said wall of said one component, said visual indicating means being threaded into engagement with said port and being removable from said port.

28. An assembly as defined in claim 22, wherein said biasing component is a spring.

29. An assembly as defined in claim 22, wherein said material in said housing is solder which melts and permits said member to be biased relative to said housing when said predetermined temperature is reached by said at least one bearing.

30. An assembly as defined in claim 22, wherein said plug is brass.

31. An assembly as defined in claim 22, further comprising a third component mounted on one of said first and second components by at least one bolt, said visual indicating means being disposed on said bolt.

32. An assembly as defined in claim 31, wherein said bolt includes a threaded shank having a bore therein, and said visual indicating means is disposed in said bore.

33. An assembly as defined in claim 32, wherein said visual indicating means comprises a biasing component which biases a member relative to said threaded shank when said predetermined temperature of said at least one bearing is reached.

34. An assembly as defined in claim 33, wherein said member is biased outwardly relative to said threaded shank when said predetermined temperature of said at least one bearing is reached.

35. An assembly as defined in claim 34, wherein said biasing component is a spring.

36. An assembly comprising:
a first component;
a second component rotatably mounted on said first component by at least one bearing;
a chamber provided between said first component and said second component;
a semi-fluid synthetic grease within said chamber for lubricating said at least one bearing;
visual indicating means associated with said chamber for providing a visual indication to a user of the temperature of said at least one bearing; and
a third component mounted on one of said first and second components by at least one bolt, said visual indicating means being disposed on said bolt, said bolt including a threaded shank having a bore therein, and said visual indicating means being disposed in said bore,
said visual indicating means comprises a biasing component which biases a member relative to said threaded shank when a predetermined temperature of said at least one bearing is reached, said member being provided in a housing disposed in said bore, said housing including material therein which becomes viscous upon the application of a predetermined amount of heat to permit said member to be biased relative to said housing when said predetermined temperature of said at least one bearing is reached.

37. An assembly comprising:
a first component;
a second component rotatably mounted on said first component by at least one bearing;
a chamber provided between said first component and said second component;

a semi-fluid synthetic grease within said chamber for lubricating said at least one bearing;

visual indicating means associated with said chamber for providing a visual indication to a user of the temperature of said at least one bearing; and a third component mounted on one of said first and second components by at least one bolt, said bolt including a threaded shank having a bore therein, and said visual indicating means being secured in said bore by adhesive.

38. An apparatus as defined in claim 15, wherein said member is biased outwardly relative to said threaded shank when said predetermined temperature is reached by said wheel bearings.

39. An apparatus as defined in claim 15, wherein said biasing component is a spring.

40. An apparatus as defined in claim 15, wherein said material in said housing is solder which melts and permits said member to be biased relative to said threaded shank when said predetermined temperature is reached by said wheel bearings.

41. An apparatus as defined in claim 36, wherein said member is biased outwardly relative to said threaded shank when said predetermined temperature is reached by said wheel bearings.

42. An apparatus as defined in claim 36, wherein said biasing component is a spring.

43. An apparatus as defined in claim 36, wherein said material in said housing is solder which melts and permits said member to be biased relative to said threaded shank when said predetermined temperature is reached by said wheel bearings.

44. An assembly as defined in claim 22, wherein said visual indicating means comprises a biasing component which biases a member relative to said chamber when said predetermined temperature is reached by said at least one bearing.

* * * * *

UNITED STATES PATENT AND TRADEMARK OFFICE
CERTIFICATE OF CORRECTION

PATENT NO. : 6,203,114 B1  
DATED : March 20, 2001  
INVENTOR(S) : Rodney P. Ehrlich Page 1 of 1

It is certified that error appears in the above-identified patent and that said Letters Patent is hereby corrected as shown below:

<u>Column 8, claim 10,</u>  
Line 14, "An wheel mounting" should be -- An --

Signed and Sealed this

Fifth Day of February, 2002

Attest:

JAMES E. ROGAN  
*Attesting Officer*  *Director of the United States Patent and Trademark Office*